(12) United States Patent
Srinivas et al.

(10) Patent No.: US 8,498,009 B2
(45) Date of Patent: Jul. 30, 2013

(54) SYSTEM AND METHOD FOR IDENTIFYING A CAUSE OF LATENESS OF A PRINT JOB IN A PRINT PRODUCTION ENVIRONMENT

(75) Inventors: Sharath Srinivas, Webster, NY (US); Sudhendu Rai, Fairport, NY (US); Eric Michael Gross, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 704 days.

(21) Appl. No.: 12/785,127

(22) Filed: May 21, 2010

(65) Prior Publication Data
US 2011/0286032 A1  Nov. 24, 2011

(51) Int. Cl.
*G06F 3/12* (2006.01)
(52) U.S. Cl.
USPC .......... 358/1.15; 709/203; 709/218; 709/219; 709/224; 718/101
(58) Field of Classification Search
USPC ............... 358/1.13, 1.14, 1.15; 709/202, 203, 709/218, 219, 224; 718/101
See application file for complete search history.

(56) References Cited

U.S. PATENT DOCUMENTS

2008/0137914 A1  6/2008  Minhas

*Primary Examiner* — Vu B Hang
(74) *Attorney, Agent, or Firm* — Fox Rothschild LLP (57) ABSTRACT

A system for determining a cause of lateness of a print job may include a computing device and a computer-readable storage medium in communication with the computing device. The computer-readable storage medium may include one or more programming instructions for identifying a late print job, identifying a plurality of document production stations that processed at least a portion of the late print job, determining an associated contribution value representing a contribution of the document production station to the lateness, determining sources of the lateness, displaying a first visual depiction that visually depicts a measure of a contribution of each of the identified document production stations to a collective lateness of the print shop, receiving a user selection of one of the document production stations and a time period, and displaying a second visual depiction of one or more print jobs processed by the document production station during the time period.

22 Claims, 9 Drawing Sheets

SYSTEM AND METHOD FOR IDENTIFYING A CAUSE OF LATENESS OF A PRINT JOB IN A PRINT PRODUCTION ENVIRONMENT

BACKGROUND

On-time completion of jobs is an important customer requirement in print shops. The percentage of jobs that complete on time is often used as an indicator of the health of a print shop. When jobs do complete late, however, it is beneficial to be aware of the factors contributing to the lateness. This is usually accomplished in an ad-hoc manner by shop floor managers who use knowledge of the print shop and job flows to identify the contributory factors. But, this process is often complicated because job lateness is usually a function of several print shop parameters such as congestion, machine downtime, inefficiency of resources and operator allocation. Due to the time and the complexity of the analytical effort required to identify the factors contributing to job lateness, the analysis is not often performed. This can result in problems in the day-to-day operations of the print shop.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a system for determining a cause of lateness of a print job may include a computing device and a computer-readable storage medium in communication with the computing device. The computer-readable storage medium may include one or more programming instructions for identifying a late print job, where a lateness associated with the late print job is an amount by which a turnaround time associated with the late print job exceeds a threshold value. The computer-readable storage medium may include one or more programming instructions for identifying a plurality of document production stations in a print shop that processed at least a portion of the late print job, for each identified document production station, determining an associated contribution value representing a contribution of the document production station to the lateness, determining one or more sources of the lateness from the identified document production stations based on the associated contribution values, displaying a first visual depiction that visually depicts a measure of a contribution of each of the identified document production stations to a collective lateness of the print shop, receiving a user selection of one of the document production stations identified in the first visual depiction and a time period, and in response to the user selection, displaying a second visual depiction of one or more print jobs processed by the document production station during the time period.

In an embodiment, a method of determining a cause of lateness of a print job may include identifying a late print job, where a lateness associated with the late print job is an amount by which a turnaround time associated with the late print job exceeds a threshold value. The method may include identifying a plurality of document production stations in a print shop that processed at least a portion of the late print job, for each identified document production station, determining, by a computing device, an associated contribution value representing a contribution of the document production station to the lateness, determining, by the computing device, one or more sources of the lateness from the identified document production stations based on the associated contribution values, displaying, on a display device, a first visual depiction that visually depicts a measure of a contribution of each of the identified document production stations to a collective lateness of the print shop, receiving a user selection of one of the document production stations identified in the first visual depiction and a time period, and in response to the user selection, displaying, on the display device, a visual depiction of one or more print jobs processed by the document production station during the time period.

DETAILED DESCRIPTION

The following terms shall have, for purposes of this application, the respective meanings set forth below:

A "job shop" refers to a production environment that processes jobs. A job shop may be a freestanding entity or it may be part of a corporation or other entity. Additionally, a job shop may communicate with one or more servers by way of a local area network or a wide area network, such as the Internet, the World Wide Web or the like. A job shop may include a print shop.

A "print shop" refers to a job shop that produces documents and includes a plurality of document production devices, such as printers, cutters, collators and/or the like.

A "job" refers to a logical unit of work that is to be completed for a customer. For example, a job may include pages, batches, units and/or the like. A job may include one or more print jobs from one or more clients. Although the disclosed embodiments pertain to print shops, the disclosed methods and systems can be applied to production environments generally.

A "print job" refers to a job processed in a print shop. For example, a print job may include producing credit card statements corresponding to a certain credit card company, producing bank statements corresponding to a certain bank, printing a document or the like.

A "late print job" refers to a print job having a turnaround time that exceeds a threshold value. For example, a print job may have a completion deadline of 5 pm on Friday. If the print job is not completed by this time, it may be classified as a late print job.

"Lateness" refers to a measure of the difference between an actual turnaround time and an expected turnaround time for a print job. In an embodiment, lateness may be a measure of the difference between an actual turnaround time plus an acceptable delay and an expected turnaround time for a print job.

"Turnaround time" refers to the amount of time required to completely process a job.

A "document production station" is a portion of a print shop the includes one or more document production devices that perform one or more functions on a print job.

Figure 1:
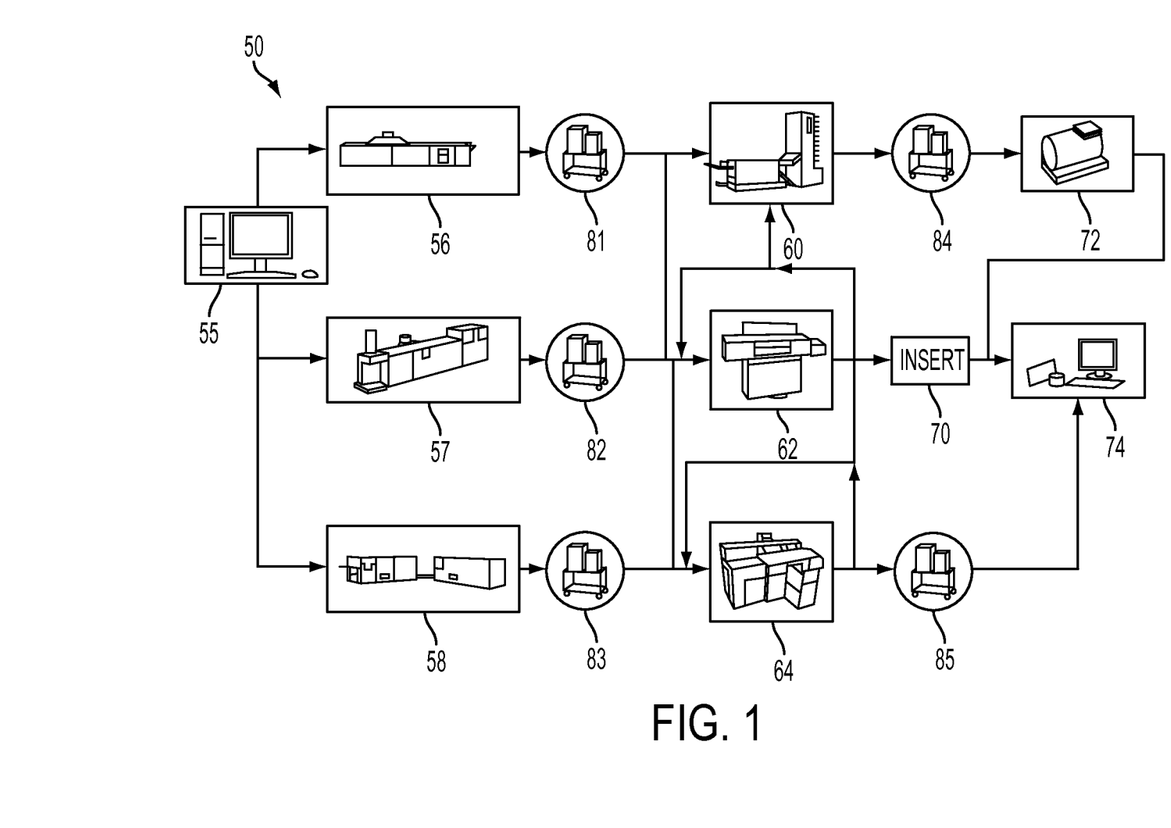
FIG. 1 illustrates an exemplary production environment according to an embodiment.

FIG. 1 shows an example of a production environment 50, in this case, exemplary elements of a print shop according to an embodiment. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one station to another in the print shop by automatic delivery or manual delivery such as by hand or by one or more paper carts 81-85.

Figure 2:
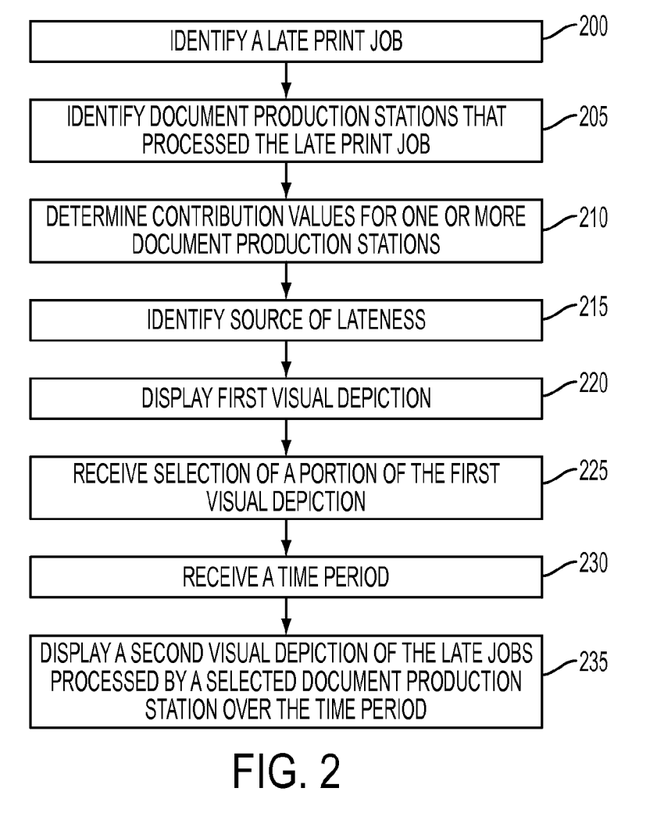
FIG. 2 illustrates an exemplary method of determining a cause of lateness of a print job according to an embodiment.

FIG. 2 illustrates an exemplary method of determining a cause of lateness of a print job according to an embodiment. As illustrated by FIG. 2, a late print job may be identified 200. In an embodiment, a late print job may be identified 200 in an automated manner by one or more document production stations in a print shop. For example, the station may compare the expected turnaround time for a print job to the actual turnaround time for the print job, and may identify the print job as late if the actual turnaround time exceeds the expected turnaround time by a threshold value. Alternatively, a late print job may be identified 200 by a manager, operator and/or the like of a print shop through selection or input of an indicator of lateness.

In an embodiment, one or more of the document production stations that processed the late print job may be identified 205. In an embodiment, the identified document production stations may be a subset of all document production stations in the print shop. For example, a print shop may include a printer, cutter and laminator. However, a print job that only requires printing and laminating may only be processed by the printer and laminator.

In an embodiment, a contribution value may be determined 210 for one or more of the identified document production stations. A contribution value may be a measure of the contribution of the document production station or set of stations to the lateness of the associated print job. In an embodiment, a print job may be processed by a plurality of document production stations using a workflow. A workflow refers to a sequence of production stations that process a job in a particular order. For example, a print job that requires printing, laminating and cutting may first be processed by a printer, a laminator, and a cutter in that order.

In an embodiment, a contribution value for a document production station may be based on a wait time and/or a processing time associated with the document production station. A wait time may be the amount of time a late print job waited for a document production station before the document production station began processing the print job. A processing time may be the amount of time for the document production station to process the late print job.

Figure 3:
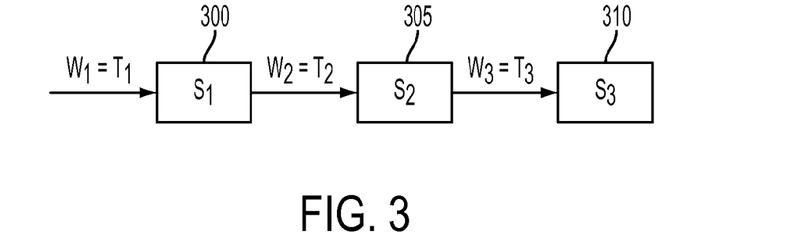
FIG. 3 illustrates exemplary wait times associated with document production stations in a print shop according to an embodiment.

FIG. 3 illustrates exemplary wait times associated with a workflow of three document production stations in a print shop according to an embodiment. As illustrated by FIG. 3, a print job may be processed by document production station $S_1$ 300, document production station $S_2$ 305 and document production station $S_3$ 310 in that order. The wait time associated with document production station $S_1$ 300 may be represented as $W_1$, which may be equal to a value of $T_1$. Similarly, the wait time associated with document production station $S_2$ 305 may be represented as $W_2$, which may be equal to a value of $T_2$, and the wait time associated with document production station $S_3$ 310 may be represented as $W_3$, which may be equal to a value of $T_3$. In an embodiment, the T values may be assigned values equal to the percent of turnaround time associated with the late print job.

In an embodiment, a contribution value, $C_i$, of a station or station set, i, to the overall probability of a print job going late may be represented by:

$$C_i = p(\text{lateness} | W_i = T_i) * T_i;$$

where $p(\text{lateness}|W_i=T_i)$ is the conditional probability of a print job completing late given a wait time at station or station set i of $T_i$.

In an embodiment, a total probability of a print job in a print shop being late, considering all stations or sets of stations, i . . . n, may be represented by:

$$p(\text{late}) = \sum_{i=1}^{n} p(\text{lateness} | W_i = T_i),$$

In an embodiment, the conditional probability may be determined based on historical print job information. Historical print job information may be information pertaining to one or more historical print jobs. In an embodiment, a historical print job may be one that has been previously processed by the print shop. Historical job information may include, for one or more historical print jobs, turnaround times, processing times and/or wait times for one or more document production stations and/or the like.

In an embodiment, each document production station may be associated with a profile that may include information regarding the wait times of one or more historical print jobs processed by the document production station. The profile may be used to determine the contribution value associated with the document production station. For example, if a majority of historical print jobs spent half of their turnaround time waiting for a first document production station, $S_1$, but still most of them completed before they were due, then the conditional probability associated with the document production station $S_1$, $p(\text{lateness}|W_i=50\%)$, may be relatively low. However, if the majority of historical print jobs spent 35% of their turnaround time waiting for another document production station, $S_2$, and most of them were completed after they were due, then the conditional probability associated with document production station S2, p(lateness|$W_i$=35%), may be relatively high. In an embodiment, contribution values of the wait times for each document production station in the print production environment that processed a late print job may be determined, and one or more sources of lateness may be identified 215. In an embodiment, the document production station associated with the highest contribution value may be identified 215 as the primary source of lateness. In an embodiment, document production stations having a contribution value that exceeds a threshold value may be identified 215 as sources of lateness.

Figure 4:
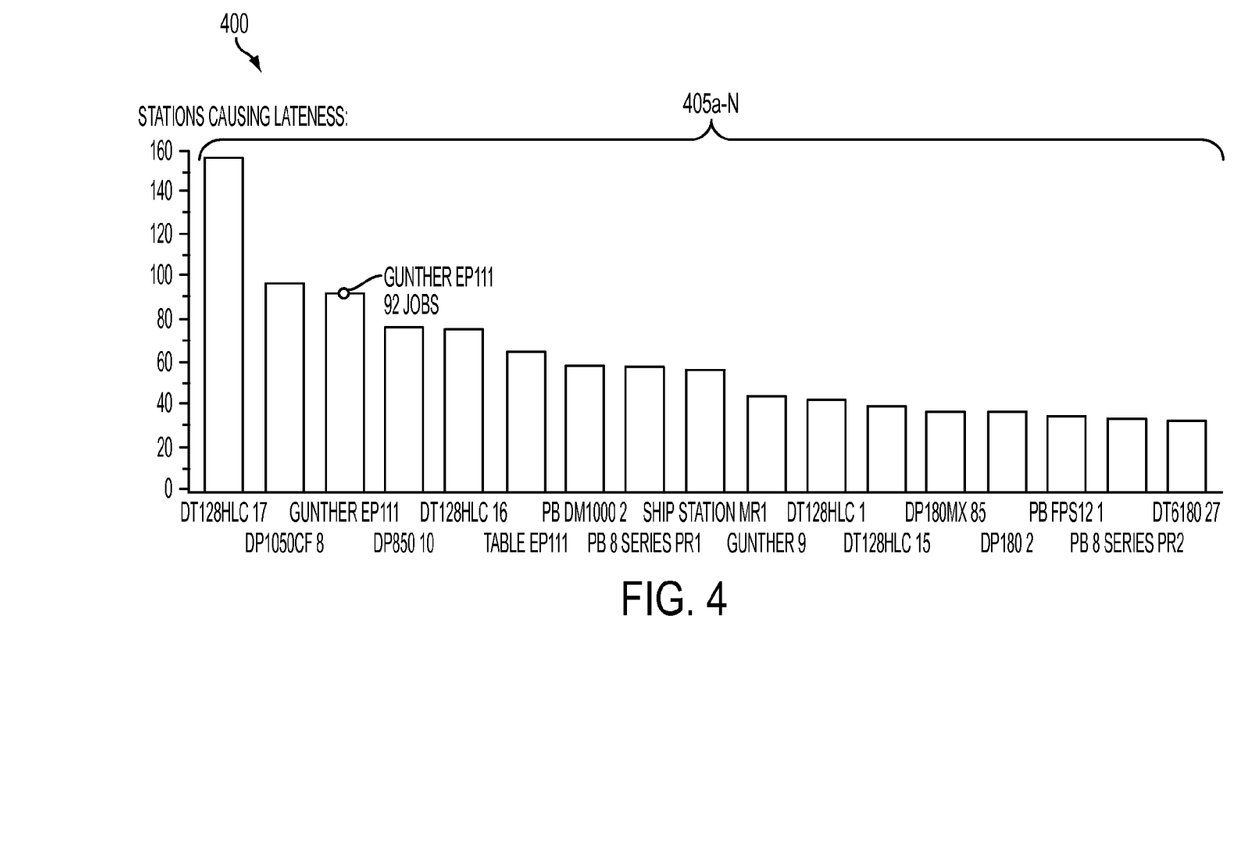
FIG. 4 illustrates an exemplary Pareto chart showing the total number of late print jobs processed by seventeen document production stations in a print shop according to an embodiment.

In an embodiment, a visual depiction of a measure of the responsibility of one or more document production stations for lateness may be displayed 220 to a user. In an embodiment, a visual depiction of a measure of the responsibility of one or more document production stations to the collective lateness of the print shop may be displayed 220 to a user. For example, a graph showing how many late print jobs were processed by one or more document production stations over a certain period of time may be displayed 220. In an embodiment, the visual depiction may be a bar chart, a Pareto chart or other type of graph. For example, FIG. 4 illustrates an exemplary Pareto chart 400 showing the total number of late print jobs processed by seventeen document production stations in a print shop.

In an embodiment, a selection by a user of a portion of the visual depiction about which the user would like to obtain further information may be received 225. For example, referring to FIG. 4, a user may select a Pareto bar 405a-N corresponding to a document production station in order to learn more information about the late print jobs processed by the document production station. Alternatively, a user may select an identifier associated with a document production station or set of stations, such as the document production station's name, model number, or other identifier. In an embodiment, a user may select a portion of a visual depiction by using a mouse or other input device to select the portion of interest. Alternatively, a user may press one or more keys of an input device to select the portion of interest. Additional and/or alternate selection methods may be used within the scope of this disclosure.

In an embodiment, a user selection of a time period over which the user wishes to obtain further information may be received 230. For example, a user may select a particular document production station, and may provide a time period of the previous week. As such, information concerning the print jobs processed by the selected document production station over the past week may be provided to a user. Additional and/or alternate time periods may be used within the scope of this disclosure.

Figure 5:
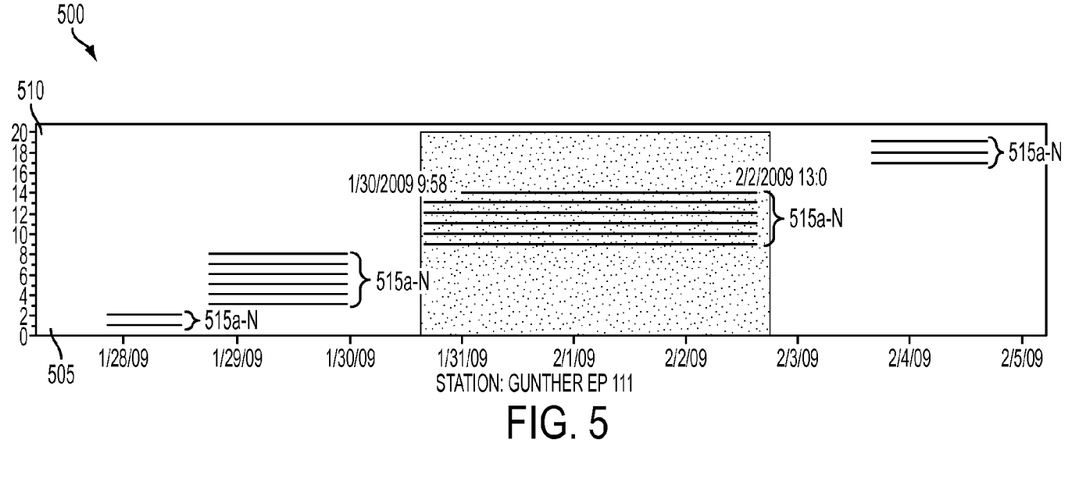
FIG. 5 illustrates an exemplary visual depiction of late print job information according to an embodiment.

In response to receiving the user's selection of a document production station and/or a time period, a visual depiction of the late jobs processed by the selected document production station over the identified time period may be displayed 235. In an embodiment, the visual depiction may be a graph, a chart and/or the like. FIG. 5 illustrates an exemplary visual depiction 500 of late print job information that may be displayed 235 in response to receiving a selection of the Gunther EP111 document production station from FIG. 4 and a time period from Jan. 28, 2009 through Feb. 5, 2009.

In an embodiment, the visual depiction may show the selected time period, the total number of jobs processed by the document production station over the time period, the total number of late print jobs processed by the document production station over the time period, the amount of time spent by the document production station to process one or more print jobs and/or the like. For example, referring to FIG. 5, the horizontal axis 505 of the illustrated graph represents the selected time period, while the vertical axis 510 represents the total number of print jobs that were processed by the document production station over the selected time period. Each line 515a-N on the graph represents a late print job processed, by the document production station, and the length of each line indicates the time spent by the document production station to process the late print job.

Figure 6:
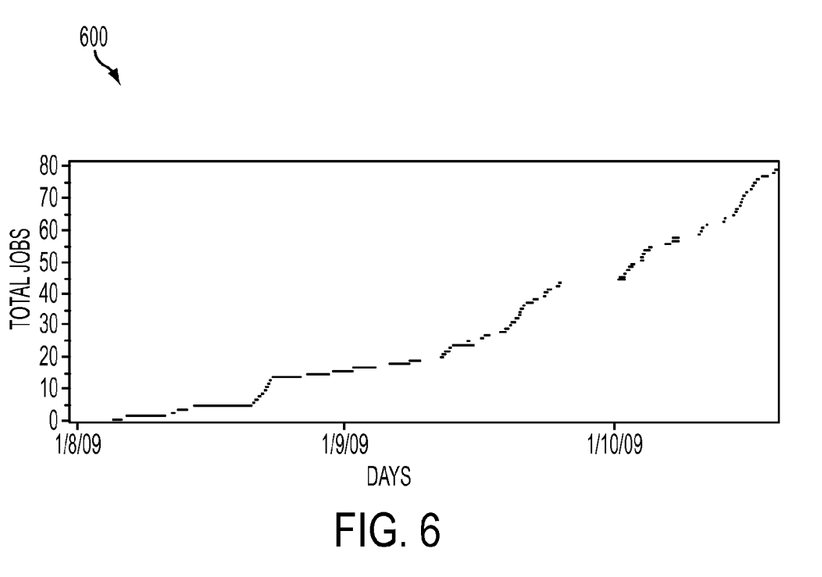
FIGS. 6-8 illustrate exemplary visual depictions according to an embodiment.
Figure 7:
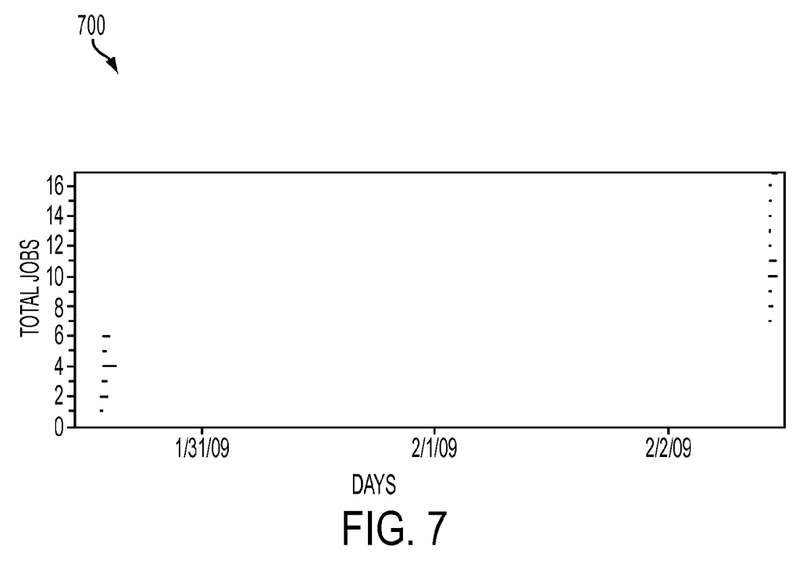
Figure 8:
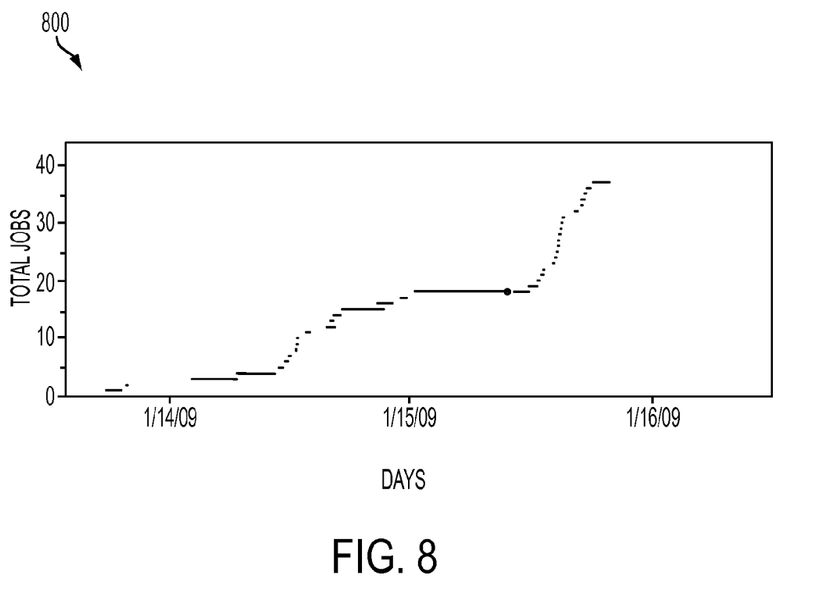

FIGS. 6-8 illustrate exemplary visual depictions that may be displayed 230 to a user according to an embodiment. As illustrated by FIGS. 6-8, the visual depiction may be a graph that depicts the total number of jobs over the selected time period. In an embodiment, the visual depiction may be used to identify patterns in the document production station's processing. For example, the visual depiction 600 in FIG. 6 shows that the document production station had very little idle time, so there was no opportunity for the print jobs that were waiting for this document production station to have been processed any earlier. As such, the determination could be made, based on this visual depiction, that this document production station was over-utilized.

The visual depiction 700 in FIG. 7 shows that the document production station had a very long period of inactivity, so the print jobs that were waiting for this document production station could have been processed earlier if this document production station had a longer uptime. As such, the determination could be made, based on this visual depiction, that this document production station was under-utilized.

The visual depiction 800 in FIG. 8 shows that the operator of the document production station spent a long period of time processing a single job 805. As such, a determination could be made, based on this visual depiction, that jobs processed by this document production station ran late due to operator inefficiency.

Figure 9:
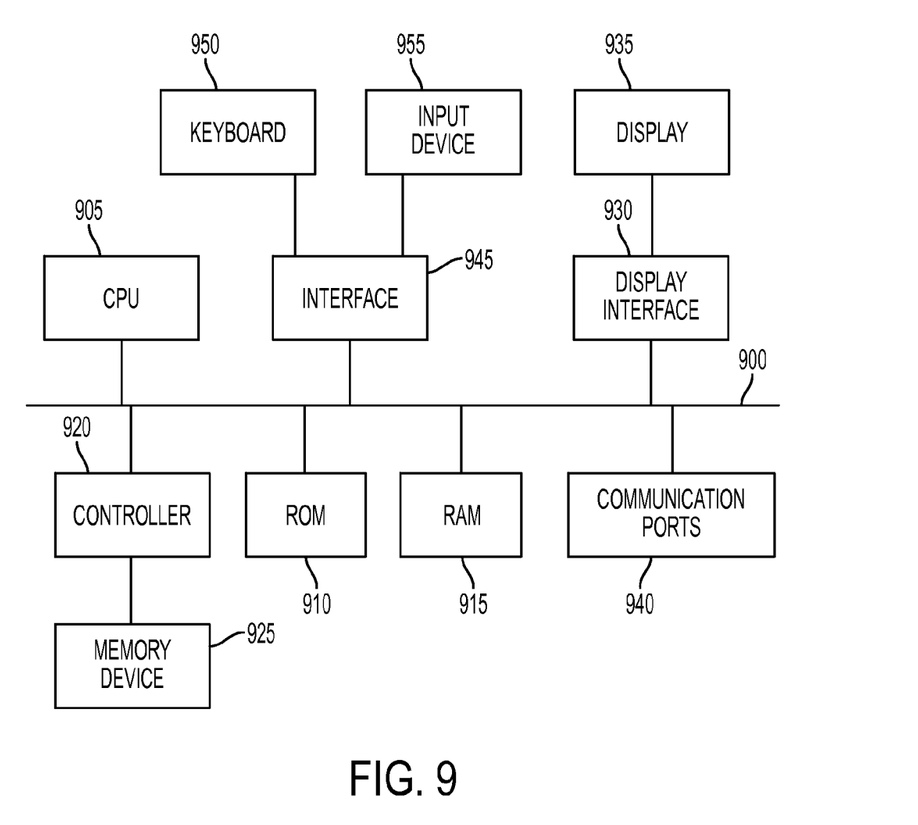
FIG. 9 illustrates a block diagram of example hardware that may be used to contain or implement program instructions according to an embodiment.

FIG. 9 depicts a block diagram of exemplary internal hardware that may be used to contain or implement program instructions according to an embodiment. A bus 900 serves as the main information highway interconnecting the other illustrated components of the hardware. CPU 905 is the central processing unit of the system, performing calculations and logic operations required to execute a program. Read only memory (ROM) 910 and random access memory (RAM) 915 constitute exemplary memory devices.

A controller 920 interfaces with one or more optional memory devices 925 to the system bus 900. These memory devices 925 may include, for example, an external or internal DVD drive, a CD ROM drive, a hard drive, flash memory, a USB drive or the like. As indicated previously, these various drives and controllers are optional devices.

Program instructions may be stored in the ROM 910 and/or the RAM 915. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 930 may permit information from the bus 900 to be displayed on the display 935 in audio, visual, graphic or alphanumeric format. Communication with external devices may occur using various communication ports 940. An exemplary communication port 940 may be attached to a communications network, such as the Internet or an intranet.

The hardware may also include an interface 945 which allows for receipt of data from input devices such as a keyboard 950 or other input device 955 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for determining a cause of lateness of a print job, the system comprising:
 a computing device; and
 a computer-readable storage medium in communication with the computing device, wherein the computer-readable storage medium comprises one or more programming instructions for:
  identifying a late print job, wherein a lateness associated with the late print job is an amount by which a turnaround time associated with the late print job exceeds a threshold value,
  identifying a plurality of document production stations in a print shop that processed at least a portion of the late print job,
  for each identified document production station, determining an associated contribution value representing a contribution of the document production station to the lateness,
  determining one or more sources of the lateness from the identified document production stations based on the associated contribution values,
  displaying a first visual depiction that visually depicts a measure of a contribution of each of the identified document production stations to a collective lateness of the print shop,
  receiving a user selection of one of the document production stations identified in the first visual depiction and a time period, and
  in response to the user selection, displaying a second visual depiction of one or more print jobs processed by the document production station during the time period.

2. The system of claim 1, wherein the one or more programming instructions for determining an associated contribution value comprise one or more programming instructions for:
 determining a wait time associated with the document production station;
 determining a conditional probability of the late print job completing on time given the wait time; and
 multiplying the wait time by the conditional probability.

3. The system of claim 2, wherein the one or more programming instructions for determining a wait time comprise one or more programming instructions for identifying a wait time from a profile associated with the document production station, wherein the wait time is based on historical print job information associated with a plurality of print jobs that have been previously processed by the document production station.

4. The system of claim 2, wherein the one or more programming instructions for determining a conditional probability comprise one or more programming instructions for determining the conditional probability from a profile associated with the document production station, wherein the probability is based on historical print job information associated with a plurality of print jobs that have been previously processed by the document production station.

5. The system of claim 1, wherein the one or more programming instructions for determining one or more sources of the lateness comprise one or more programming instructions for identifying the document production station having a greatest contribution value as a source of lateness.

6. The system of claim 1, wherein the one or more programming instructions for determining one or more sources of lateness comprise one or more programming instructions for identifying one or more document production stations having a contribution value that exceeds a threshold value as a source of the lateness.

7. The system of claim 1, wherein the one or more programming instructions for displaying a first visual depiction that visually depicts a measure of a contribution of each of the identified document production stations to a collective lateness of the print shop comprise one or more programming instructions for displaying a first visual depiction showing a total number of late print jobs processed by each of the identified document production stations.

8. The system of claim 7, wherein the one or more programming instructions for displaying a first visual depiction comprise one or more programming instructions for displaying a Pareto chart having one or more bars, wherein each bar corresponds to an identified document production station, wherein a length of each bar corresponds to the total number of late print jobs processed by the corresponding identified document production station.

9. The system of claim 1, wherein the one or more programming instructions for receiving a user selection of one of the document production stations identified in the first visual depiction and a time period comprise one or more programming instructions for receiving a selection of at least a portion of the first visual depiction that corresponds to one of the identified document production stations.

10. The system of claim 1, wherein the one or more programming instructions for receiving a user selection of one of the document production stations identified in the first visual depiction and a time period comprise one or more programming instructions for receiving the time period from a user.

11. The system of claim 1, wherein the one or more programming instructions for displaying a second visual depiction of one or more print jobs processed by the document production station during the time period comprise one or more programming instructions for displaying a graph comprising:
 the time period;
 a total number of print jobs processed by the document production station during the time period; and
 an amount of time spent by the document production station to process one or more of the print jobs.

12. A method of determining a cause of lateness of a print job, the method comprising:
 identifying a late print job, wherein a lateness associated with the late print job is an amount by which a turnaround time associated with the late print job exceeds a threshold value,
 identifying a plurality of document production stations in a print shop that processed at least a portion of the late print job,
 for each identified document production station, determining, by a computing device, an associated contribution value representing a contribution of the document production station to the lateness, determining, by the computing device, one or more sources of the lateness from the identified document production stations based on the associated contribution values, displaying, on a display device, a first visual depiction that visually depicts a measure of a contribution of each of the identified document production stations to a collective lateness of the print shop, receiving a user selection of one of the document production stations identified in the first visual depiction and a time period, and in response to the user selection, displaying, on the display device, a visual depiction of one or more print jobs processed by the document production station during the time period.

13. The method of claim 12, wherein determining an associated contribution value comprises:

determining a wait time associated with the document production station;

determining a conditional probability of the late print job completing on time given the wait time; and multiplying the wait time by the conditional probability.

14. The method of claim 13, wherein determining a wait time comprises identifying a wait time from a profile associated with the document production station, wherein the wait time is based on historical print job information associated with a plurality of print jobs that have been previously processed by the document production station.

15. The method of claim 13, wherein determining a conditional probability comprises determining the conditional probability from a profile associated with the document production station, wherein the probability is based on historical print job information associated with a plurality of print jobs that have been previously processed by the document production station.

16. The method of claim 12, wherein determining one or more sources of the lateness comprises identifying the document production station having a greatest contribution value as a source of the lateness.

17. The method of claim 12, wherein determining one or more sources of lateness comprises identifying one or more document production stations having a contribution value that exceeds a threshold value as a source of the lateness.

18. The method of claim 12, wherein displaying a first visual depiction that visually depicts a measure of each of the identified document production station's contribution to a collective lateness of the print shop comprises displaying a graph showing a total number of late print jobs processed by each of the identified document production stations.

19. The method of claim 18, wherein displaying a first visual depiction comprises o displaying a Pareto chart having one or more bars, wherein each bar corresponds to an identified document production station, wherein a length of each bar corresponds to the total number of late print jobs processed by the corresponding identified document production station.

20. The method of claim 12, wherein receiving a user selection of one of the document production stations identified in the first visual depiction and a time period comprises receiving a selection of at least a portion of the visual depiction that corresponds to one of the identified document production stations.

21. The method of claim 12, wherein receiving a user selection of one of the document production stations identified in the first visual depiction and a time period comprise receiving the time period from a user.

22. The system of claim 12, wherein displaying a second visual depiction of one or more print jobs processed by the document production station during the time period comprises displaying a second visual depiction comprising one or more of the following:

the time period;

a total number of print jobs processed by the document production station during the time period; and an amount of time spent by the document production station to process one or more of the print jobs.

* * * * *